April 3, 1956  A. C. ALLEN  2,740,862
SPACE HEATER CONTROL
Filed April 23, 1953
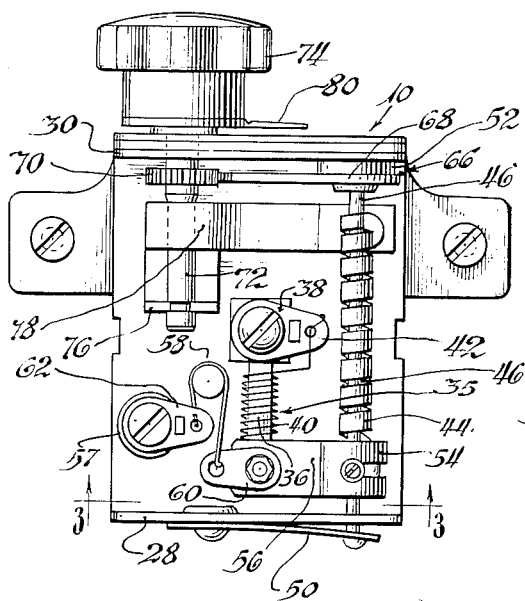
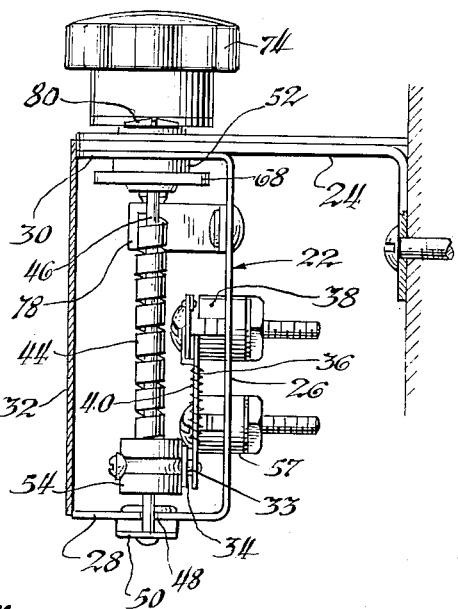
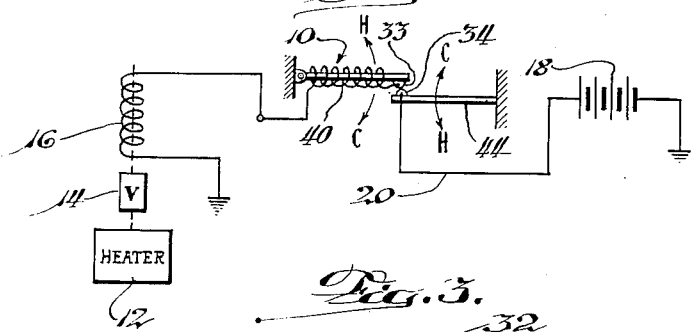
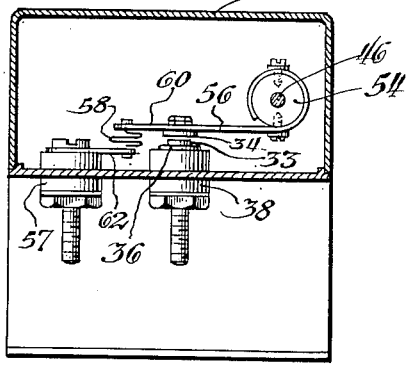
Inventor:
Arthur C. Allen
By Ahlberg, Wupper & Gradolph
Attorneys.

United States Patent Office 2,740,862
Patented Apr. 3, 1956

2,740,862

SPACE HEATER CONTROL

Arthur C. Allen, Chicago, Ill., assignor to Stewart-Warner Corporation, Chicago, Ill., a corporation of Virginia Application April 23, 1953, Serial No. 350,731

2 Claims. (Cl. 200—122)

The present invention relates to an improved thermotatic device for controlling a space heater susceptible of operation alternately at full capacity to produce heat at a high rate and under standby conditions in which heat is produced at a much lower rate or not at all.

One object of the invention is to provide for a heater of the above character an improved thermostatic control device capable of maintaining within exacting limits a predetermined temperature within a heated space by an enforced cycling of the heater between short periods of high heat output and short periods of low heat output, the time duration ratio of the high heat output periods to the low heat output periods being determined by the temperature of the heated space.

A further object is to provide a compact temperature control device of the character recited in the previous object, which can be placed in any desired location within the heated space.

Other objects and advantages will appear from the following description of the exemplary form of the invention shown in the drawings, in which:

Fig. 1 is a side view of a temperature control device embodying the invention, a cover portion of the casing for the device being removed for clearness in illustration;

Fig. 2 is a right end view of the device of Fig. 1 the casing cover being shown in section;

Fig. 3 is a horizontal sectional view taken along the line 3—3 of Fig. 1 and showing the lower portion of the structure in this figure; and Fig. 4 is a diagrammatic illustration indicating the manner in which the vital control elements of the device are integrated into an electrical system for controlling a space heater.

Although the illustrated temperature control device 10 is not necessarily limited in its application to the control of any specific type of space heating unit, it is specially suited for controlling combustion type heaters designed to operate either at full capacity in which they have a high heat output or in a standby condition in which they ordinarily have a much lower heat output. As indicated diagrammatically in Fig. 4, a conventional combustion heater 12 of this type may be controlled by a shiftable fuel valve 14 to produce heat either at its full capacity rate or its lower standby rate. This control valve 14 may be conveniently operated by a solenoid 16 energized by a battery 18 (or other suitable source of electric power) through an electrical control circuit 20. In an installation of this type, the control device 10 embodying the present invention is interposed electrically into the control circuit 20, closing the circuit to initiate a high heat period of the heater 12 and opening the circuit to begin a low heat period.

In the present instance, the working elements of the control 10 are mounted within a casing 22 equipped with a suitable support bracket 24. A stationary portion of the casing, including an anchor plate 26 and two end plates 28, 30, is embraced by a removable U-shaped cover 32 which completes the casing. Two opposed contacts 33, 34 mounted within the casing 22 are electrically interposed in series in the control circuit 20.

During operation of the control device 10, rapid cycling means 35 connected to the contact 33 moves the latter into and out of engagement with contact 34, opening and closing the control circuit 20 at short, regular intervals. As a result, the heater 12 alternates between periods of high heat output and periods of low heat output, the periods of high heat output being sufficiently short so as not to cause an appreciable rise in the temperature of the heated space and the periods of low heat output not being of sufficient duration to allow an appreciable drop in the temperature of the heated space. This enforced cycling of the heater 12 minimizes the temperature fluctuations within the heated space to a negligible minimum.

As shown, the rapid cycling means 35 comprises an elongated bimetallic strip 36 anchored at one end to a terminal 38 medially located on the anchor plate 26. The contact 33, mounted on the downwardly projecting, free end of the bimetallic strip, is moved into engagement with the opposed contact 34 upon cooling of the strip. Suitable provision is made for electrically insulating the strip 36 from both the contact 33 and the terminal 38.

An electrical heating element 40, formed by a resistance wire coiled along the strip 36 is connected in series with the control circuit 20, opposite ends of the wire being connected to the contact 33 and to a conductor blade 42 projecting from the inner end of the terminal 38. Upon engagement of the contact 33 with the contact 34 the then energized heating element 40 begins to apply heat to the thermostatic strip 36. This causes the strip 36 to bend away from the contact 34, thus breaking the control circuit to terminate the high heat period of the heater 12 and deenergize the electrical element 40. As soon as the residual heat of the heating element 40 and the strip 36 has been dissipated somewhat, the strip swings the contact 33 back toward the contact 34 to continue the cyclic control action.

Regulation of the overall heat output of the heater 12 to maintain the temperature within the heated space at the desired level is effected by varying the time duration ratio of the high heat periods to the low heat periods of the heater, which follow each other in rapid order. For this purpose a more sensitive thermostatic element 44, responsive to decreases and increases in the ambient temperature of the control, is connected to the contact 34 to move the latter toward and away from the contact 33, thereby varying the time in which the two contacts remain in engagement and hence the duration of the successive periods of high heat.

Structurally, the thermostatic element 44 is formed from a long bimetallic strip coiled about a vertical support rod 46. The lower end of the rod 46 projects downwardly through an aperture 48 in the casing plate 28. An elongated spring 50 fixed at one end to the underside of the plate 28 engages the downwardly projecting end of the rod 46 to bias the rod upwardly, seating its upper end in a bearing 52 fixed to the underside of the upper casing plate 30.

The upper end of the coiled bimetallic element 44 is fixed to its support rod 46; the lower end of the element is attached to a spool 54 journaled on the lower end of a rod. An arm 56 fixed to the spool 54 extends radially therefrom to form a movable support for the contact 34, attached to the end of the arm in opposing relation to the contact 33.

Insulated from its support arm 56 by suitable insulating washers or the like, the contact 34 is connected to a second terminal 57 on the anchor plate 26 by a freely flexible coil 58 of wire. Preferably, the coil 58 is connected at opposite ends to a blade 60 carried by the arm 56 and electrically connected to the contact 34 and a blade 62 on the inner end of the terminal 57. The two terminals 38 and 57 are connected in series in the control circuit 20.

Adjustment of the temperature to be maintained by the control device is provided for by manual adjusting means 66 connected mechanically in series with the ambient temperature thermostat 44 and the contact 34 for adjusting the latter in relation to the contact 33.

As shown, the manual adjusting means 66 comprises a sector gear 68 fixed to the upper end of the thermostat support rod 46 just below the bearing 52 and extending laterally across the casing 22 to engage a pinion gear 70 on a shaft 72. The upper end of the shaft 72 extends through the upper casing plate 30 to join with an operating knob 74; the lower end of the shaft is necked to slip horizontally into a slot formed in the horizontal leg of a support bracket 76 on the anchor plate 26. A spring 78 anchored at one end to the inner face of an anchor plate 26 engages the medial portion of the shaft 72 to retain its lower end seated in the bracket 76 and to impose a rotational drag on the shaft which serves to maintain the manual adjusting means 66 in the position to which it is turned.

The temperature which the control device is set to maintain is indicated by a pointer 80 fixed to the knob 74 to move over a graduated scale (not shown) on the underlying portion of the device.

The control device 10 thus provided is a self contained unit that can be placed at any desired location within the heated space.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A control device for a space heater, comprising, in combination, a casing member having two spaced end plates thereon, a bearing on one of said end plates, an elongated control rod, a cantilever spring fixed to the other of said end plates and engaging one end of said rod to hold the other end of the rod in said bearing, a slotted bracket on said casing member, a control shaft extending through one of said end plates and journaled in said slotted bracket, a cantilever spring mounted on said casing member and engaging said shaft to hold the latter in engagement with said slotted bracket, gear means on said shaft and said rod coacting to transmit rotary movement of the shaft to the rod, a bimetallic element sensitive to ambient temperature coiled around the rod and attached at one end thereto, first and second coacting electrical contacts adapted to be connected into a heater control circuit, means connecting said bimetallic element with said first contact to move the latter away from said second contact upon warming of the bimetallic element, a second bimetallic element connected to said second contact to move the latter away from said first contact upon being heated, and electrical heating means for said second bimetallic element connected to one of said contacts to be energized upon engagement thereof with the other contact.

2. An electrical control device for a space heater, comprising, in combination, a casing member, an elongated rod, means on said casing member rotatably supporting opposite ends of said rod, means for adjusting the rotary position of said rod, an ambient temperature responsive bimetallic element coiled around said rod and connected thereto at one end, a laterally extending arm journaled on said rod and connected to the other end of said bimetallic element, a first electrical contact carried by the free end of said arm and facing generally in a direction opposite to the direction of arm movement incident to warming of said bimetallic element, a second electrical contact opposing said first contact, a second bimetallic element supporting said second contact for movement away from said first contact upon heating of said second element, electrical heating means for said second bimetallic element connected in series with said second contact, and flexible conductor means connected directly to said first contact on said movable arm.

References Cited in the file of this patent

UNITED STATES PATENTS

| | | |
|---|---|---|
| 1,562,932 | Walker | Nov. 24, 1925 |
| 1,571,104 | Baker | Jan. 26, 1926 |
| 1,793,954 | Myers | Feb. 24, 1931 |
| 2,499,906 | Crise | Mar. 7, 1950 |

FOREIGN PATENTS

| | | |
|---|---|---|
| 593,370 | Great Britain | Oct. 15, 1947 |
| 643,553 | Germany | Apr. 12, 1937 |